United States Patent
Hammer et al.

(10) Patent No.: US 6,821,588 B1
(45) Date of Patent: Nov. 23, 2004

(54) FILM CONTAINING STARCH OR STARCH DERIVATIVES AND POLYESTER URETHANES

(75) Inventors: Klaus-Dieter Hammer, Mainz (DE); Michael Ahlers, Mainz (DE); Gerhard Grolig, Moerfelden-Walldorf (DE); Hans-Gerhard Fritz, Uhingen (DE); Thomas Seidenstuecker, Cologne (DE)

(73) Assignee: Kalle GmbH & Co. KG, Weisbaden (DE)

( * ) Notice: Subject to any disclaimer, the term of this patent is extended or adjusted under 35 U.S.C. 154(b) by 0 days.

(21) Appl. No.: 09/700,839

(22) PCT Filed: May 18, 1999

(86) PCT No.: PCT/EP99/03400

§ 371 (c)(1),
(2), (4) Date: Nov. 21, 2000

(87) PCT Pub. No.: WO99/61524

PCT Pub. Date: Dec. 2, 1999

(30) Foreign Application Priority Data

May 25, 1998 (DE) .......................................... 198 22 979

(51) Int. Cl.$^7$ ............................................. A22C 13/00
(52) U.S. Cl. .................. 428/34.8; 138/118.1; 428/35.6; 428/36.9; 428/346; 452/30; 452/35
(58) Field of Search ...................... 138/118.1; 428/34.8, 428/35.6, 36.9, 346, 910; 452/30, 35

(56) References Cited

U.S. PATENT DOCUMENTS

| | | | |
|---|---|---|---|
| 5,412,005 A | * 5/1995 | Bastioli et al. ............... | 524/47 |
| 5,898,049 A | 4/1999 | Müller ....................... | 525/54.3 |
| 5,928,737 A | * 7/1999 | Hammer et al. ........... | 428/34.8 |
| 5,928,739 A | 7/1999 | Pophusen et al. .......... | 428/34.8 |
| 5,961,906 A | * 10/1999 | Muller et al. ............... | 264/109 |
| 6,096,809 A | * 8/2000 | Lorcks et al. ................. | 524/47 |

FOREIGN PATENT DOCUMENTS

| | | |
|---|---|---|
| DE | 3428111 | 3/1985 |
| DE | 247830 | 7/1987 |
| DE | 1951477 | 10/1996 |
| DE | 19633476 | 2/1998 |
| DE | 198055925 | 8/1999 |
| EP | 0709030 A1 | 5/1996 |
| EP | 0820698 A1 | 1/1998 |
| EP | 0841432 A1 | 5/1998 |

* cited by examiner

Primary Examiner—Sandra M. Nolan
(74) Attorney, Agent, or Firm—Connolly Bove Lodge & Hutz LLP

(57) ABSTRACT

The invention relates to a film which is produced form a thermoplastic polymer mixture containing the following: a) thermoplastic starch and/or a thermoplastic starch derivative and b) at least one polyester urethane, with the weight ratio a):b) being in the range from 75:25 to 5:95, and the surface-related degree of stretching the film being 2 to 70. The polyester urethanes forms a matrix in the mixture and the thermoplastic starch or a thermoplastic starch derivative being distributed in a microdispersion in the form of particles with a diameter $d_p$ of 0.05 to 30 μm. The invention also relates to a method for the inventive film and its use as a packaging film, especially for artificial sausage skins.

15 Claims, No Drawings

FILM CONTAINING STARCH OR STARCH DERIVATIVES AND POLYESTER URETHANES

The invention relates to a film containing thermoplastic starch and/or thermoplastic starch derivatives and is particularly suitable as food casing. In addition the invention relates to a process for producing this food casing and its use as packaging film, in particular as sausage casing.

Most sausage casings consist of animal gut, but also from fiber-reinforced regenerated cellulose, collagen or synthetic polymers. Although cellulose and collagen are of natural origin, the production of such sausage casings is carried out in complex and environmentally polluting processes. Casings made of other material, for example from protein-coated or acrylate-coated fabric, in contrast, are of only small importance.

Of the known casings, those made from cellulose hydrate have the broadest spectrum of applications. However, for some uses they have an excessive permeability to water vapor and/or oxygen. Collagen casings have a lower permeability, but are too labile in contrast. The casings made of synthetic polymers are unsuitable for producing long-keeping sausage. Although they may be produced inexpensively and simply, for example by extrusion, they are however not biodegradable, in contrast to the cellulose hydrate or collagen casings.

Although the sausage casing which is described in EP-A 0 709 030 and is produced by extrusion of thermoplastic starch is biodegradable, it still has deficiencies. It is, in particular, not sufficiently cooking-resistant and has a tendency to embrittlement after water treatment or due to plasticizer loss.

Finally, single-layer or multilayer tubular biaxially oriented food casings are also known which consist of a thermoplastic biodegradable polymer or
 comprise at least one layer thereof (EP-A 0 820 698). They are produced by an extrusion process. Thermoplastic biodegradable polymers which can be used in this process are aliphatic or partially aromatic polyesters, thermoplastic aliphatic polyester urethanes, aliphatic-aromatic polyester carbonates and in particular aliphatic polyester amides. Tubular casings made of these polymers, in particular polyester urethanes, however, have a poor caliber constancy, which leads to problems during processing.

The object was therefore to develop a food casing which may be made from natural renewable raw materials in a simple and environmentally conserving manner, as far as possible by an extrusion process, and which is at the same time compostable or at least biodegradable. The casing is to be sufficiently permeable and usable for virtually all sausage types, that is to say for producing cooked-meat sausages and scalded-immersion sausages and for raw sausages.

The object is achieved by a mixture (blend) of a) thermoplastic starch and/or a thermoplastic starch derivative (both termed "TPS" hereinafter) and b) at least one polyester urethane.

The present application thus relates to a film which comprises thermoplastic starch and/or a thermoplastic starch derivative and which is produced from a thermoplastic mixture which comprises a) thermoplastic starch and/or a thermoplastic starch derivative and b) at least one polyester urethane, in which the weight ratio a):b) is in the range from 75:25 to 5:95, preferably from 30:70 to 60:40, and which has an area-based drawing ratio of from 2 to 70, preferably from 4 to 40, particularly preferably from 6 to 20. If appropriate, the film can also comprise native starch. For fine adjustment of the stress/strain pattern, organic or inorganic finely dispersed fillers can also be added to the blend. In the polymer blend, the polyester urethane forms the continuous matrix in which the thermoplastic starch or the thermoplastic starch derivative is embedded in microdisperse distribution in the form of discrete particles having a diameter $d_p$ of from 0.05 to 30 $\mu$m, preferably between 0.1 and 3.0 $\mu$m. In the drawn state, the film preferably has a thickness of from 30 to 120 $\mu$m, particularly preferably from 50 to 80 $\mu$m. It can be used as packaging film, in particular for foods, especially as seamless, tubular sausage casing.

The thermoplastic starch derivative is preferably a starch ester, as is described in detail in DE-A 195 15 477. The acid component in the ester is generally a ($C_2$–$C_{10}$)alkanoic acid which is preferably unbranched or has only a low degree of branching. A particularly preferred and inexpensive starch alkanoate is starch acetate having a degree of substitution of less than 3, in particular from 1.5 to 2.4. In contrast to starch itself, starch esters, such as starch acetate, are already thermoplastic as such and do not need to be plasticized first. Starch esters having a relatively long alkyl chain, for example starch hexanoates, starch octanoates or starch decanoates, cause a change in suppleness and toughness, and also in the permeation of the food casings. By combining various starch esters, casings can be produced having very specific properties. Starch ethers and thermoplastic starch derivatives which have cationic quaternary side groups having hydrophobic ($C_2$–$C_{18}$)alkyl groups, preferably ($C_2$–$C_{12}$)alkyl groups, are also suitable. Finally, anionic starch derivatives can also be used.

It has been found that casings which consist only of thermoplastic starch and/or thermoplastic starch derivatives do not yet have the desired extent of extensibility, strength, toughness, suppleness, but especially stability to hot or boiling water. Casings made of pure polyester urethane also do not have the desired properties.

Specifically they lack strength, temperature stability and caliber constancy. They cannot then be significantly improved even if other low molecular substances such as lubricants, plasticizers and fillers are added to the thermoplastic starch or the thermoplastic starch derivative.

Surprisingly, it has been found that a significant improvement occurs when the thermoplastic starch or the starch derivative is mixed with thermoplastic polyester urethanes.

The thermoplastic polyester urethane (also termed "TPU" hereinafter) consists of hard polyurethane and soft polyester segments, the segments being arranged in alternating sequence. "Soft" denotes segments having a glass transition temperature ($T_g$) of −20° C. or below, in contrast "hard" denotes those having $T_g$ of +30° C. or above. The polyester urethane can be of aliphatic or aromatic nature. The proportion of polyurethane segments in the thermoplastic polyester urethane is in this case from 10 to 90% by weight, preferably from 20 to 50% by weight, in each case based on the total weight of the polyester urethane. They generally consist of diisocyanate and diol unites. The diisocyanate unites can be aliphatic, cycloaliphatic or aromatic. Examples of aliphatic diisocyanates are butane 1,4-diisocyanate and hexane 1,6-diisocyanate. Isophorone diisocyanate (=3-isocyanatomethyl-3,5,5-trimethylcyclohexane isocyanate) represents a cycloaliphatic diisocyanate. Toluene 2,4-diisocyante and 2,6-diisocyanate, diphenylmethane 2,2'-diisocyanate, 2,4'-diisocyante, 2,6'-diisocyanate and 4,4'-diisocyanate, and naphthalene 1,5-diisocyanate are preferred aromatic diisocyanates.

The polyester segments generally have a mean molar mass $M_w$ of from 500 to 10,000 g/mol, preferably from 1000 to 4000 g/mol. They preferably consist of units of dihydric or polyhydric alcohols and units of dibasic or polybasic carboxylic acids. They may be prepared from said starting materials by condensation polymerization in the presence of catalysts such as titanium butoxide (=orthotitanic acid tetrabutyl ester). However, usually, the polyester segments consist of diol and dicarboxylic acid units. In the condensation reaction, instead of the free acids, obviously also corresponding acid derivatives, such as carbonyl halides (in particular carbonyl chlorides), carboxylic anhydrides or ($C_1$–$C_4$)alkyl esters of carboxylic acids can be used. The diols or polyols generally have an aliphatic or cycloaliphatic backbone. Preferred diols for preparing the ester segments are ethane-1,2-diol (=ethylene glycol), propane-1,2- and -1,3diol, 2,2-dimethylpropane-1,3-diol (=neopentyl glycol), butane-1,4-diol, pentane-1,5-diol, hexane-1,6-diol and cyclohexanediylbismethanol (in particular cyclohexane-1,4-diylbismethanol). Mixtures of a plurality of different diols or polyols can also be used. The dicarboxylic acids or polycarboxylic acids preferably also have an aliphatic or cycloaliphatic backbone, aliphatic dicarboxylic acids (such as succinic acid or adipic acid) being preferred. Particular preference is given to adipic acid. A dicarboxylic acid having a cycloaliphatic backbone is, for example, cyclohexanedicarboxylic acid (especially cyclohexane-1,4-dicarboxylic acid). The polyester segments can also be made up of units of hydroxycarboxylic acids or their derivatives, for example 3-hydroxypropionic acid, 3-hydroxybutyric acid, 4-hydroxybutyric acid, 5-hydroxypentanoic acid or ε-caprolactone. Particularly suitable compounds are polyester urethanes which at a temperature of 190° C. and a load of 21.6 kg have a melt volume index (determined as specified by ISO 01133) in the range from about 5 to 15 cm$^3$/10 min.

The inventive film may surprisingly be hot-sealed or welded. For this a temperature of from about 100 to 250° C. and a contact time of from about 0.1 to 5 s are sufficient. An additional adhesive is not required. Films of thermoplastic starch alone, in contrast, are not hot-sealable. The inventive tubular food casing is, in addition, permeable to smoke, including cold smoke. It is smooth, without being greasy. In its appearance it is substantially identical to a natural gut casing. Fat particles are clearly distinguished, since the casing is preferably transparent. Even after considerable water loss, it still lies smoothly and tightly on the sausage meat emulsion. This effect is ascribed primarily to the elastic properties of the TPU matrix. The casing may be peeled off readily without it bursting spontaneously. The tear propagation resistance is good. This property may be in addition set as desired by changing the type and proportion of components in the thermoplastic mixture, in particular by incorporating a filler (for example native fine grained starch).

In addition to the components a) and b), the thermoplastic mixture can further comprise other low- or high-molecular-weight constituents which act in particular as plasticizers or lubricants or improve the compatibility of the components with one another. By means of these constituents, homogeneity and flowability of the extrudable thermoplastic mixture can if appropriate be further improved or specifically set.

Suitable plasticizers are particularly mono-, di-, tri-and polyglycerol, sorbitol, polyethylene glycol (PEG), triethyl citrate, triethyl acetyl citrate, glycerol triacetate, phthalic esters (especially dimethyl phthalate, diethyl phthalate and dibutyl phthalate) and sorbitol monoesters and diesters. The proportion of plasticizer(s) is up to 40% by weight, preferably up to 25% by weight, in each case based on the total weight of the thermoplastic mixture.

Lubricants which improve the homogeneity of the thermoplastic mixture are in particular vegetable fats or oils, synthetic triglycerides, lecithins, ethoxylated fatty alcohols or waxes. Epoxy-containing oils, in particular epoxidized linseed oil, are particularly suitable additives which ensure optimum dispersion of the thermoplastic starch in the thermoplastic polyester urethane and simultaneously, surprisingly, reduce the extruder torque in the course of preparing the mixture. The proportion of lubricant is up to 12% by weight, preferably from 0.1 to 6% by weight, in each case based on the total weight of the mixture.

The inventive film can finally further be reinforced with fibers. Generally, the fibers are relatively short (on average from about 0.1 to 3 mm, preferably from 0.2 to 1.5 mm). In order that the casing remains biodegradable, particularly suitable fibers are those from cotton linters, woodpulp, from regenerated cellulose ("regenerated fibers"), from hemp, flax, sisal or jute. The proportion of fibers is up to 30% by weight, based on the total weight of TPS+TPU. Preferably, the fiber proportion is from 2 to 15% by weight, in each case based on the total weight of the mixture. The fibers are uniformly distributed in the thermoplastic mixture in the course of the blend preparation process.

The film can further contain fillers, either instead of the fibers or additionally. Suitable fillers are, for example, calcium carbonate, talc, kaolin (especially kaolin/quartz mixtures, known as "Neuburg Silica"), titanium dioxide, silicates (especially wollastonite, an inosilicate), anhydrite (=calcium sulfate), particles of cellulose or native starch (especially those having a particle diameter of 15 μm or less). The median diameter of the filler particles ($d_{pF}$) is in the range from 0.1 to 50 μm, preferably form 0.1 to 20 μm, particularly preferably form 1 to 5 μm. Their content can be up to 30% by weight, but preferably it is from 2 to 15% by weight, particularly preferably from 4 to 10% by weight, in each case based on the total weight of the thermoplastic mixture.

For films having a particularly high stability to hot or boiling water, it has proved to be expedient to add crosslinkers to the thermoplastic mixture. Suitable crosslinkers are, for example, dicarboxylic acids, diisocyanates or triisocyanates (particularly hexamethylene diisocyanate), dialdehydes (particularly glyoxal), diepoxides, diimines, or silanes or siloxanes containing vinyl group(s), for example vinyltrimethylsilane. The crosslinker is preferably not added until the remaining components of the mixture are already molten. The proportion of crosslinker(s) is up to 10% by weight, preferably from 0.5 to 5% by weight, particularly preferably from 1 to 3% by weight, in each case based on the total weight of the thermoplastic mixture.

The production of thermoplastic starch is disclosed, for example, by WO 90/05161 and 90/10019. During the plasticization, the helix structure of the native starch is destroyed, so that it is subsequently in a substantially amorphous state. In the thermoplastic starch, from 50 to 100% by weight, preferably at least 80% by weight, of the native starch originally used is in denatured form. The degree of denaturation may be determined by image analysis of exposures made by polarized light, by differential scanning calorimetry (DSC) or by determination of x-ray scattering. The denaturation and plasticization are performed by heating and by supplying mechanical energy, for example by relatively long thermal treatment in a kneader or in a single- or twin-screw extruder. In order that the starch melts below its decomposition temperature, additives are necessary, such as water, glycerol, propane-1,3-diol, butane-1,4-diol, pentane-1,5-diol, hexane-1,6diol, neopentyl glycol, diglycerol, N,N-dimethylurea, sorbitol or citrate. During plasticization with water, from about 20 to 25% by weight of water, preferably about 17% by weight of water, are added, in each case based on the weight of the native starch. A mass temperature of from about 100 to 130° C. is maintained. During plasticization with glyercol, its proportion is from about 0.5 to 30% by weight, preferably from 8 to 25% by weight, again in each case based on the weight of the native starch. In this case, a mass temperature of from 150 to 170° C. has proved to be expedient. By means of this treatment the proportion of crystalline starch may be decreased to 5% by weight or less.

The thermoplastic mixture may be produced in conventional apparatuses, for example in a double-screw extruder, from said components. Particularly suitable extruders are those having two corotating tightly meshing screws whose speed of rotation is preferably from 50 to 400 rpm. If the gap area of screw surfaces move in opposite directions, they display higher shear action and can therefore impart a high energy input into the material to be extruded. A homogeneous thermoplastic melt mixture forms from the individual components at a temperature from 150 to 230° C., preferably from 170 to 210° C.

To prepare the thermoplastic mixture, a plurality of process variants are possible. In the first variant, native starch is firstly plasticized using the described denaturation aids (in particular glycerol). Via a side feeder the thermoplastic polyurethane is then fed. It is mixed with the molten and degassed thermoplastic starch, and the resultant mixture is again degassed. The melt can then be extruded, and after cooling converted into storage-stable granules. It can equally well also be fed directly, by means of a melt pump, to a ring die and processed to form a tubular food casing. In a further process variant, granulated thermoplastic starch or a granulated starch derivative serves as starting material. After its melting and degassing in the extruder, mixing with the TPU follows. In a third variant TPS and TPU are fed together to the extruder. Finally, the thermoplastic polyester urethane can also be mixed with native starch and thus "filled". During mixing in the extruder, a sufficient proportion of the starch is already plasticized, in particular if a plasticizing aid (for example glycerol) is further added.

To produce a tubular film, the thermoplastic mixture is extruded through a heated ring die. The temperature in the ring die is from 100 to 160° C. and thus preferably somewhat less than in the upstream heating zones of the compounding extruder or plasticizing extruder (there it is generally from 110 to 190° C.).

The present invention thus also relates to a process for producing the inventive film in which a tube produced by extrusion is blown by inflation with air (or another gas), the area-based drawing ratio $\lambda_A = \lambda_1 \cdot \lambda_2$ being in the range from 2 to 70, preferably from 4 to 40, particularly preferably from 6 to 20. In the blown tubular film process, the drawing ratios are defined as follows:

$$\lambda_1 = D_S/D_D; \lambda_2 = V_S/V_D, \lambda_3 = S_S/S_D,$$

where
$D_S$ is the film tube diameter,
$D_D$ is the die diameter,
$v_S$ is the tube take-up velocity,
$v_D$ is the mean melt exit velocity from the die,
$S_S$ is the film thickness and
$S_P$ is the die outlet gap width.

For reasons of continuity, $\lambda_1 \cdot \lambda_2 \cdot \lambda_3 = 1$ must apply, that is to say the area-based drawing ratio $\lambda_A$ is inversely proportional to the product thickness reduction $\lambda_3$.

If a flat film is to be produced, the polymer melt can also be extruded through a slot die. By drawing in a longitudinal and transverse direction (for example using a tenter frame), the specified area-based drawing ratios may then be achieved. In addition, the described blown tubular film can obviously also be converted by simple cutting to a flat film.

The tubes do not obtain the optimum strength, extensibility, caliber constancy and shrinking properties until the drawing and orienting process. How strongly pronounced each of these properties is primarily depends on the composition of the thermoplastic mixture. Thus the food casings, by targeted selection of type and proportion of the individual components of the thermoplastic mixture or by setting the drawing parameters, may be adapted to the different requirements. If appropriate the blown casings can also be partially heat-set. The inventive film generally consists of only one layer. However, by coextrusion multilayer casings may also be produced.

By washing in a suitable bath, for example a water bath or a bath of dilute (about 1% strength by weight) acid, water-soluble plasticizers or plasticizing aids may be removed from the inventive film. Surprisingly, it has been found that as a result the mechanical properties of the film are not impaired. The proportion of plasticizers or plasticizing aids after this washing is preferably less than 2% by weight, based on the total weight of the dry casing.

In a further process step, the tubular casings can be furnished with an inner and/or outer preparation in order to make them more suitable for the various uses as sausage casing.

For this, most of the liquid preparations which are also customary for enhancing cellulose hydrate casings may be used in appropriately adapted concentration. Thus it is particularly expedient to coat the inner surface of a casing intended for long-keeping sausage with protein (preferably casein, gelatin, soy protein or wheat protein). The protein in this case is customarily bound to the casing surface with a (dialdehyde. By using resins or by the addition of release agents to the protein/aldehyde, the peelability of the sausage casing can be set. The adhesion of the casing to the sausage meat emulsion may be reduced, using known formulations, to a strong separation action (this is, for example, required in the case of Thüringer Blutwurst).

Suitable outer preparations are also already known from cellulose casings. By treating the outer surface of the casing with such a preparation, in particular mold resistance, surface roughness and printability may be set.

The inventive food casing can have its properties varied so broadly that they correspond to a natural gut or a cellulose casing. Their good swelling and shrinking properties have the effect that they always lie tightly on the sausage meat emulsion and that even with slow drying no creases form. By selecting the components the permeability of the casing for water, water vapor and oxygen can be set exactly. Surprisingly, it has been found that the inventive casing is permeable to smoke, so that they are particularly suitable for smoked raw sausage types (for example salami or cervelat sausage). However, other foods, for example cheese, may also be packaged with the inventive casing.

The starch used for producing the casing in addition belongs to the particularly readily used renewable raw materials. During composting, the inventive casing is particularly rapidly degraded, since, in addition to the polyester urethane, the readily utilizable starch is also available to the microbes as carbon source. Thus cometabolic degradation takes place in which the hard aromatic polyurethane segments are much more rapidly degraded than as normal.

The examples below are intended to describe the invention in more detail. The percentages are percentages by weight unless stated otherwise.

Production of the Thermoplastic Polymer Mixtures

EXAMPLE 1

Production of thermoplastic starch and of the mixture of thermoplastic starch and polyurethane a) 100 kg of corn starch were dried under reduced pressure to a water content of less than 0.3% and melted and well mixed with 20 kg of glycerol (99% pure) and 2 kg of epoxidized linseed oil in a double-screw extruder at 160 to 190° C. It was then extruded and granulated. During subsequent storage of the granules the starch remained in an amorphous and thus thermoplastic state.

b) 100 kg of native corn starch and 20 kg of glycerol were mixed and plasticized together with 2 kg of epoxidized linseed oil in a corotating double-screw extruder having a processing length of 40 D, starch denaturation occurring. By a plurality of degassings, the water content was reduced to below 1% by weight, based on the total weight of the corn starch used. The extrusion was performed using the temperature profile 100° C.→175° C.→170° C.

c) 60 kg of the granules described under b) were melted in a double-screw extruder, degassed and then mixed with 60 kg of thermoplastic polyester urethane, the TPU being fed via a side feeder. The ester segments in the polyester urethane consisted of adipic acid and ethylene glycol units and had a mean molar mass $M_w$ of from 3500 to 4000 g/mol. The thermoplastic polymer mixture was then granulated.

EXAMPLE 2

Example 1 was repeated with the single difference that a polyester urethane was used whose ester segments were made up of adipic acid and butane-1,4-diol units and had a mean molar mass of 2000 g/mol.

EXAMPLE 3

Example 1 was repeated with the single difference that the TPU had a proportion of 40 instead of 50% by weight, based on the total weight of the thermoplastic mixture.

EXAMPLE 4

Example 2 was repeated with the single difference that the TPU had a proportion of 40 instead of 50% by weight, based on the total weight of the thermoplastic mixture.

Production of the Food Casings

EXAMPLE 5

The granules described in Example 2 were melted in an extruder at 170° C. The rotary speed of the extruder screw was 35 revolutions per minute. The melt was then extruded through a ring die having a diameter of 25 mm and a die gap width of 1.0 mm. The temperature in the ring die was 165° C., the take-up velocity was 4.7 m/min. After blowing, a tube having a diameter of 65 mm (=caliber 65) was obtained ($\rightarrow D_S/D_D = \lambda_1 = 2.6$).

EXAMPLE 6

The granules described in Example 1 were melted and extruded as in the preceding example. The ring die in this case had a diameter of 25 mm and a die gap width of 0.75 mm. After blowing, a tube of caliber 120 having a wall thickness of 60 $\mu$m was obtained. In the water-soaked state, the ultimate tensile strength $\sigma_R$ of the tube was 14.3 N/mm$^2$ and the elongation at break $\epsilon_R$ was 211%.

EXAMPLE 7

The granules described in Example 2 were melted and extruded. The ring die in this case had a diameter of 10 mm and a die gap width of 0.9 mm. The temperature of the tube extrusion die was 145° C., the take-up velocity 4.5 m/min. After blowing, a tube of caliber 30 having a wall thickness of 65 $\mu$m was obtained. In the water-soaked state its ultimate tensile strength was 11.3 N/mm$^2$ and the elongation at break was 236%.

EXAMPLES 8 to 10

The granules described in Example 2 were melted (melt temperature of 182° C.) and extruded. The rotary speed of the extruder screw was 29 rpm. The ring die in this case had a diameter of 15 mm and a die gap width of 0.6 mm. Extrusion was performed with the following barrel temperature profile: 130° C., 170° C., 190° C., 190° C. The exit velocity was 1.24 m/min, and the output was 2.5 kg/h. In this manner, blown film tubes of caliber 45 (flat width 70 mm) having differing wall thicknesses were produced. The fluctuation in the flat width was ±0.5 mm. In the table below the experimental data and process parameters are summarized.

TABLE

| Examples | 8 | 9 | 10 |
|---|---|---|---|
| Take-up velocity [m/min] | 2.7 | 4.2 | 3.0 |
| Wall thickness [$\mu$m] | 88 | 51 | 72 |
| Longitudinal drawing | 2.2 | 3.4 | 2.4 |
| Transverse drawing | 2.9 | 2.9 | 2.9 |
| Thickness ratio | 7.2 | 11.4 | 8.6 |
| Ultimate tensile strength [N/mm$^2$] | | | |
| longitudinal | 19.6 | 20.3 | 19.5 |
| transverse | 17.2 | 16.2 | 17.9 |
| Elongation at break [%] | | | |
| longitudinal | 446.7 | 468.1 | 446.7 |
| transverse | 453.3 | 415.2 | 443.4 |
| in the water-soaked state | | | |
| Ultimate tensile strength (transverse) [N/mm$^2$] | 6.7 | 6.3 | 6.3 |
| Elongation at break (transverse)[%] | 221 | 168.9 | 192.4 |
| after washing with deionized water and after drying | | | |
| Wall thickness [$\mu$m] | 70 | | |
| Residual glyercol content, based on the dry casing [%] | 1.3 | | |
| Ultimate tensile strength (transverse) [N/mm$^2$] | 20.5 | | |
| Elongation at break (transverse) [%] | 232 | | |

The inventive food casings are stable in water, but swell therein and shrink again on drying. They can be mounted onto the stuffing apparatus in the form of sections tied off at one end or in compressed form as what are termed "shirred sticks". They are suitable in particular as casings for long-keeping sausage (that is to say a raw sausage having a particularly high degree of ripening).

The casings were stuffed with salami meat emulsion. The adhesion to the sausage meat emulsion was low (peelability after 2 weeks: "2" on a rating scale of 1 to 6, where "1"

represents "very readily peelable" and "6" represents "excessively strong adhesion, casing cannot be non-destructively withdrawn").

The advantage of the inventive casings is that TPU itself ensures no great affinity to the long-keeping sausage meat emulsion and for this emulsion no additional preparation is necessary.

What is claimed is:

1. A film produced from a thermoplastic mixture which comprises in microdisperse distribution; a) thermoplastic starch, a thermoplastic starch derivative or both a thermoplastic starch and thermoplastic starch derivative, and b) at least one polyester urethane, with the weight ratio a):b) being in the range from 75:25 to 5:95, and which has an area-based drawing ratio of from 2 to 70, and wherein said at least one polyester urethane comprises hard polyurethane segments and soft polyester segments, the segments being arranged in alternating sequence.

2. The film as claimed in claim 1, wherein the weight ratio a):b) is in the range from 30:70 to 60:40.

3. The film as claimed in claim 1, wherein the thermoplastic starch derivative is a starch ester.

4. The film as claimed in claim 1, wherein the proportion of polyurethane segments in the thermoplastic polyester urethane is from 10 to 90% by weight based on the total weight of the polyester urethane.

5. The film as claimed in claim 1, wherein the thermoplastic mixture comprises at least one plasticizer, the proportion of plasticizer(s) being up to 40% by weight, based on the total weight of the thermoplastic mixture.

6. The film as claimed in claim 1, wherein the thermoplastic mixture comprises at least one lubricant, the proportion of lubricant(s) being up to 12% by weight based on the total weight of the thermoplastic mixture.

7. The film as claimed in claim 1, wherein the thermoplastic mixture is mixed with fibers, the proportion of fibers being up to 30% by weight, based on the total weight of the mixture.

8. The film as claimed in claim 1, wherein the thermoplastic mixture comprises fillers, the proportion of the fillers being up to 30% by weight, based on the total weight of the mixture.

9. The film as claimed in claim 1, wherein the thermoplastic mixture comprises at least one crosslinker, the proportion crosslinker(s) being up to 10% by weight, based on the total weight of the mixture.

10. The film as claimed in claim 1, wherein it is hot-sealable.

11. The film as claimed in claim 1, wherein said film comprises an inner, an outer preparation or both an inner and outer preparation.

12. A process for producing a film as claimed in claim 1, which comprises blowing the tube which is produced from the thermoplastic mixture by extrusion, the are-based drawing ratio being in the range from 2 to 70.

13. A packaging film comprising a film as claimed in claim 1.

14. A seamless, tubular casing comprising a film as claimed in claim 1.

15. A film produced from a thermoplastic mixture which comprises in microdisperse distribution: a) thermoplastic starch, a thermoplastic starch derivative or both a thermoplastic starch and thermoplastic starch derivative, and b) at least one polyester urethane comprising units selected from the group consisting of dihydric alcohols, polyhydric alcohols, dibasic carboxylic acids and polybasic carboxylic acids, with the weight ratio a):b) being in the range from 75:25 to 5:95, and which has an area-based drawing ratio of from 2 to 70.

* * * * *